United States Patent
Shionoya

(10) Patent No.: US 7,567,110 B2
(45) Date of Patent: Jul. 28, 2009

(54) CLOCK DISTRIBUTION CIRCUIT

(75) Inventor: Shinichi Shionoya, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 182 days.

(21) Appl. No.: 11/790,342

(22) Filed: Apr. 25, 2007

(65) Prior Publication Data

US 2007/0252632 A1 Nov. 1, 2007

(30) Foreign Application Priority Data

Apr. 28, 2006 (JP) ............................. 2006-125248

(51) Int. Cl.
*G06F 1/04* (2006.01)
(52) U.S. Cl. ...................... 327/295; 327/293
(58) Field of Classification Search ......... 327/291–293, 327/295
See application file for complete search history.

(56) References Cited

U.S. PATENT DOCUMENTS 5,852,379 A * 12/1998 Jiang ........................... 327/176
5,987,620 A * 11/1999 Tran ............................ 713/600
6,049,241 A * 4/2000 Brown et al. ................. 327/295
6,104,224 A * 8/2000 Koshikawa ................... 327/277
6,246,277 B1 * 6/2001 Nitta et al. ................... 327/292

FOREIGN PATENT DOCUMENTS

JP 2001-319975 11/2001

* cited by examiner

*Primary Examiner*—Lincoln Donovan
*Assistant Examiner*—William Hernandez
(74) *Attorney, Agent, or Firm*—Young & Thompson

(57) ABSTRACT

A clock distribution circuit for distributing an input clock according to an embodiment of the present invention includes: a first clock buffer receiving the clock; a first clock mask series-connected to the first clock buffer and controlling clock input to the first clock buffer; a second clock buffer series-connected to the first clock buffer and receiving a clock output from the first clock mask; and a second clock mask series-connected to the first clock buffer and the second clock buffer to control clock input to the second clock buffer.

7 Claims, 5 Drawing Sheets

CLOCK DISTRIBUTION CIRCUIT

BACKGROUND OF THE INVENTION

1. Field of the Invention

The present invention relates to a clock distribution circuit, a semiconductor integrated circuit, and a clock distribution method.

2. Description of Related Art

Up to now, a batch driving system, a clock tree system, or a combination thereof has been employed in clock distribution circuits. In the clock distribution circuit of the batch driving system, a clock buffer is series-connected with a flip-flop or the like, and clocks are input. In the batch driving system, a line close to an output of the clock buffer on an integrated circuit is generally set wide to reduce a delay or improve a reliability of electromigration. In contrast, in the clock tree system, clock buffers are configured into a tree shape, and distributed on an integrated circuit. The clock distribution circuit of the clock tree system is disclosed in Japanese Unexamined Patent Application Publication No. 2001-319975.

Important factors of the clock distribution circuit are a clock skew that influences setting a chip clock timing design and a delay that influences an inter-chip clock timing design. How to reduce the skew and delay is an important problem. In the clock tree system, the skew can be more readily adjusted than the batch driving system can, and it is easy to design a circuit of this system as an integrated circuit. Hence, ASICs (Application Specific Integrated Circuit) have mainly employed the clock tree system. FIG. 4 shows an example of a clock distribution circuit for improving a clock timing accuracy, for example, suppressing such delay or variations in skew.

As shown in FIG. 4, in a conventional clock distribution circuit 900, a clock mask 911 is connected to the root where a clock is input, and a clock buffer 912 is connected to the clock mask 911. Parallel-connected clock buffers 914 and 915 are connected between the clock buffer 912 and a functional block 913. Similar clock tree structure is obtained by a clock mask 921, . . . , clock buffers 922 to 925, . . . . The clock masks 911, 921, . . . each receive a control signal mskb00 or mskb01 for determining whether or not to cancel masking.

As shown in FIG. 5, the control signal mskb00 is input to the clock mask 911 on the falling edge of the clock clkin at time t1. The clock mask 911 is turned ON in response to the control signal mskb01 to drive the clock buffer 912. The clock buffer 912 accordingly outputs the clock clkm to drive the clock buffers 914 and 915. The driven clock buffers 914 and 915 send a clock clkout to the functional block 913.

In the clock distribution circuit 900, a clock is masked at any portion of branches on the root side in the clock tree structure of, for example, the clock masks 911, 921, . . . . As a result, a current amount is largely changed when the clock masks 911, 921, . . . are turned ON/OFF. Thus, it is necessary to design an external power supply to handle a rush current when the clock masks 911, 921, . . . are turned ON/OFF.

As described above, the conventional clock distribution circuit has a problem in that a clock is masked at any portion of the root and the power supply circuit is complicated and upsized.

SUMMARY OF THE INVENTION

A clock distribution circuit for distributing an input clock according to an aspect of the present invention includes: a first clock buffer receiving the clock; a first clock mask series-connected to the first clock buffer and controlling clock input to the first clock buffer; a second clock buffer series-connected to the first clock buffer and receiving a clock output from the first clock mask; and a second clock mask series-connected to the first clock buffer and the second clock buffer to control clock input to the second clock buffer.

In this configuration, multistage clock masks provided in a clock distribution circuit of clock tree structure can drive buffers from the root to the terminal. Hence, a change in rush current that flows in accordance with ON/OFF states of the clock mask, can be reduced, so a power supply circuit can be simplified and downsized.

A semiconductor integrated circuit according to another aspect of the invention includes: a clock output circuit outputting a clock; a clock distribution circuit distributing a clock output from the clock output circuit; and a control circuit controlling operations of the clock output circuit and the clock distribution circuit, the clock distribution circuit including: a first clock buffer receiving a clock output from the clock output circuit; a first clock mask series-connected to the first clock buffer and controlling clock input to the first clock buffer; a second clock buffer series-connected to the first clock buffer and receiving a clock output from the first clock mask; and a second clock mask series-connected to the first clock buffer and the second clock buffer and controlling clock input to the second clock buffer, the control circuit controlling the second clock mask in accordance with an operation of the first clock mask.

In this configuration, multistage clock masks provided in a clock distribution circuit of clock tree structure can drive buffers from the root to the terminal. Hence, a change in rush current that flows in accordance with ON/OFF states of the clock mask, can be reduced, so a power supply circuit can be simplified and downsized.

A clock distribution method for inputting and distributing a clock according to another aspect of the invention includes: sending the input clock to a first clock buffer; outputting the input clock from the first clock buffer; and sending a clock output from the first clock buffer to a second clock buffer in response to the clock input from the first clock buffer.

In this configuration, multistage clock masks provided in a clock distribution circuit of clock tree structure can drive buffers from the root to the terminal. Hence, a change in rush current that flows in accordance with ON/OFF states of the clock mask, can be reduced, so a power supply circuit can be simplified and downsized.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

The embodiments of the present invention are described below with reference to the accompanying drawings.

Figure 1:
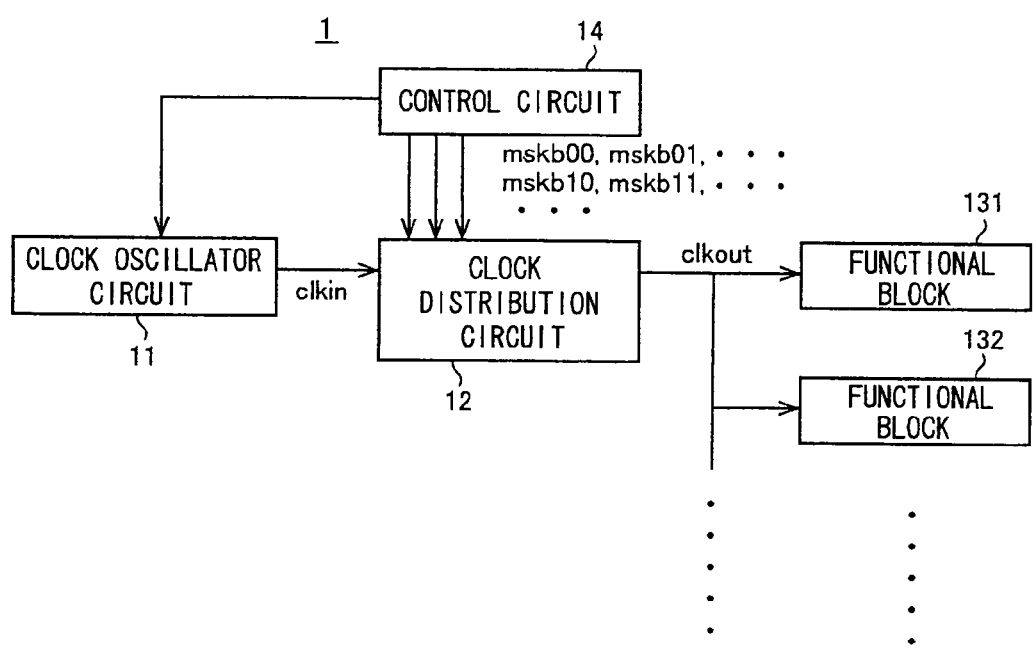
FIG. 1 is a block diagram of an example of a semiconductor integrated circuit according to an embodiment of the present invention.

Referring first to FIG. 1, the overall configuration of a semiconductor integrated circuit according to the present invention is described. FIG. 1 is a schematic diagram of a configuration example of the semiconductor integrated circuit. As shown in FIG. 1, a semiconductor integrated circuit 1 according to the present invention includes a clock oscillator circuit 11, a clock distribution circuit 12, functional blocks 131, 132, . . . and a control circuit 14.

The clock oscillator circuit 11 is intended to output a clock for synchronizing system operations, and composed of a quartz or ceramic oscillator, an amplifier circuit, or the like.

The clock distribution circuit 12 distributes clock signals to functional blocks 131, 132, . . . as described later, and is composed of various transistors. The clock distribution circuit 12 has a clock tree structure.

The functional blocks 131, 132, . . . are each composed of a flip-flop and the like and execute a predetermined function.

The control circuit 14 controls operations of various circuits.

Figure 2:
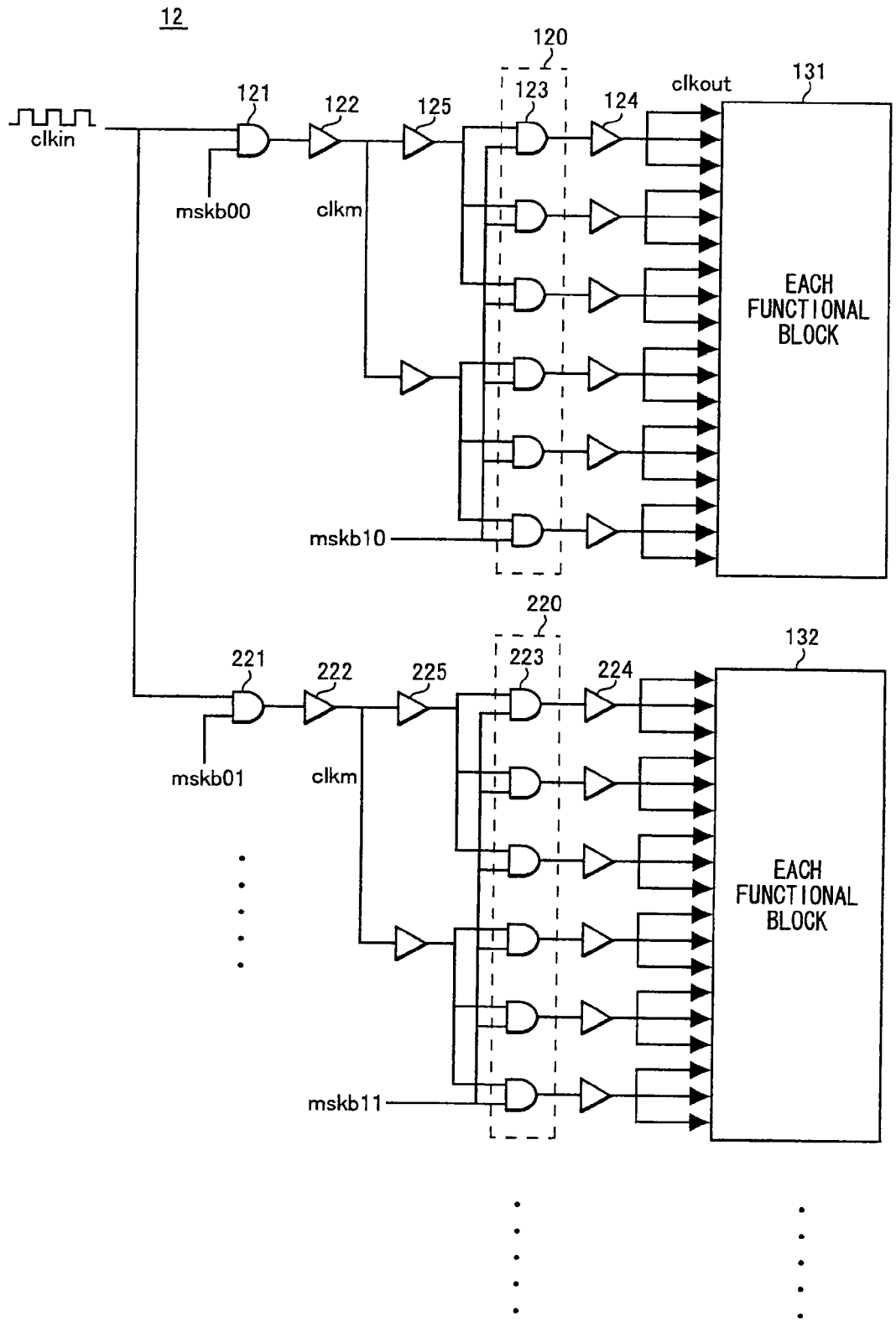
FIG. 2 is a circuit diagram of an example of a clock distribution circuit according to the embodiment of the present invention.

Referring next to FIG. 2, the configuration of the clock distribution circuit 12 according to the present invention is described in detail. The clock distribution circuit 12 of the present invention has a multistage clock tree structure to mask input clock signals over plural stages.

FIG. 2 is a circuit diagram of a configuration example of the clock distribution circuit of the present invention. FIG. 2 illustrates the clock distribution circuit 12 of two-stage configuration. However, the clock distribution circuit 12 of the other multistage configuration may be used. To be specific, in the clock distribution circuit 12 of the multistage configuration, a clock mask is connected to a clock input terminal of a clock buffer at each stage.

As shown in FIG. 2, the clock distribution circuit 12 of the present invention includes a clock mask 121 and a clock buffer 122 at the first stage, and a clock mask 123 and clock buffers 124 and 125 at the second stage.

Incidentally, in the following description, the clock mask and the clock buffer are simply referred to as "mask" and "buffer", respectively. Further, the clock mask 121 and the clock buffer 122 at the first stage are referred to as "first-stage mask 121" and "first-stage buffer 122", respectively. The clock mask 123 and the clock buffers 124 and 125 at the second stage are referred to as "second-stage mask 123" and "second-stage buffers 124 and 125", respectively.

Since the clock distribution circuit 12 has the two-stage configuration in this example, the first-stage mask 121 is provided closest to the root of the clock tree structure, that is, provided on the clock oscillator circuit 11 side. The first-stage mask 121 is connected to the control circuit 14 together with the clock distribution circuit 12.

In the clock distribution circuit 12 of the two-stage configuration, the first-stage buffer 122 is a mask provided closest to the root of the clock tree structure, that is, provided on the clock oscillator circuit 11 side. The first-stage buffer 122 is series-connected to the first-stage mask 121.

The second-stage mask 123 is provided at the terminal of the two-stage clock tree structure, that is, provided on the functional block 131 side. The second-stage mask 123 is series-connected to the first-stage buffer and parallel-connected to plural masks at the second stage. A second-stage mask group 120 including the plural masks functions as an intermediate mask circuit of the clock distribution circuit 12.

The second-stage buffer 124 is provided at the terminal of the two-stage clock tree structure, that is, provided on the functional block 131 side. The second-stage buffer 124 is series-connected to the second-stage mask 123 and series-connected to the functional block 131. Further, the second-stage buffer 124 is parallel-connected to plural buffers at the second stage.

As shown in FIG. 2, the masks 121 and 123 and the buffers 122, 124, and 125 are provided on a main branch from the root of the clock tree structure. The clock distribution circuit 12 has another branch from the root where the masks 221 and 223, and buffers 222, 224, and 225 are provided, in addition to the above branch. The same holds true for this branch, so its detailed description is omitted here.

Next, operations of the semiconductor integrated circuit 1 according to the present invention are described.

Referring to FIG. 1, the overall operations of the semiconductor integrated circuit 1 according to the present invention are described first.

In the semiconductor integrated circuit 1, if power is supplied from the power supply circuit to each circuit, each circuit starts operating. The control circuit 14 sends a control signal to the clock oscillator circuit 11 to output a clock. In response to the signal, the clock oscillator circuit 11 sends a clock clkin to the clock distribution circuit 12. In addition, the control circuit 14 sends control signals mskb00, mskb01, mskb10, mskb11, . . . to the clock distribution circuit 12 to distribute clock signals. In response to the control signal mskb00, mskb01, mskb10, mskb11, . . . ,the clock distribution circuit 12 adjusts a timing for distributing clock signals. The clock distribution circuit 12 sends a clock clkout to functional blocks 131, 132, . . . while adjusting the clock output timing. The functional blocks 131, 132, . . . execute various functions in sync with the clock clkout.

Referring to FIG. 2, operations of the clock distribution circuit 12 of the present invention are described next in detail. Here, description is focused on the branch including the masks 121 and 123, and buffers 122, 124, and 125. The same holds true for the other branches, so description thereof is omitted here.

As shown in FIG. 2, if the clock oscillator circuit 11 sends the clock clkin to the first-stage mask 121, the first-stage mask 121 controls the output of the input clock clkin. More specifically, the control circuit 14 sends the control signal mskb00 to the first-stage mask 121, and the first-stage mask 121 outputs the clock clkin to the first-stage buffer 122 on the functional block 131 side in response to the control signal mskb00.

The first-stage buffer 122 is driven in response to the clock clkin from the first-stage mask 121. The first-stage buffer 122 adjusts a delay or skew of the clock clkin, and outputs the clock clkm to the second-stage buffer 125 on the functional block 131 side. More specifically, a route for the clock clkm output from the first-stage buffer 122 branches into two routes, and the clock is input to the second-stage buffer 125. The second-stage buffer 125 adjusts input/output timings of various clocks similar to the first-stage buffer 122, and outputs the clock clkm to the second-stage mask 123.

The second-stage mask 123 controls the output of the input clock clkm. More specifically, the second-stage mask 122 outputs the clock clkm to the second-stage buffer 124 on the functional block 131 side in accordance with the control signal mskb10 from the control circuit 14. The second-stage buffer 124 adjusts timings of various clocks similar to the second-stage buffer 125, and outputs the clock clkout to the functional block 131.

In this example, the control signals mskb10 and mskb00 are independent control signals. Accordingly, the control circuit 14 independently controls the first-stage mask 121 and the second-stage mask 123, and independently controls the output of the clocks clkin and clkm.

Figure 3:
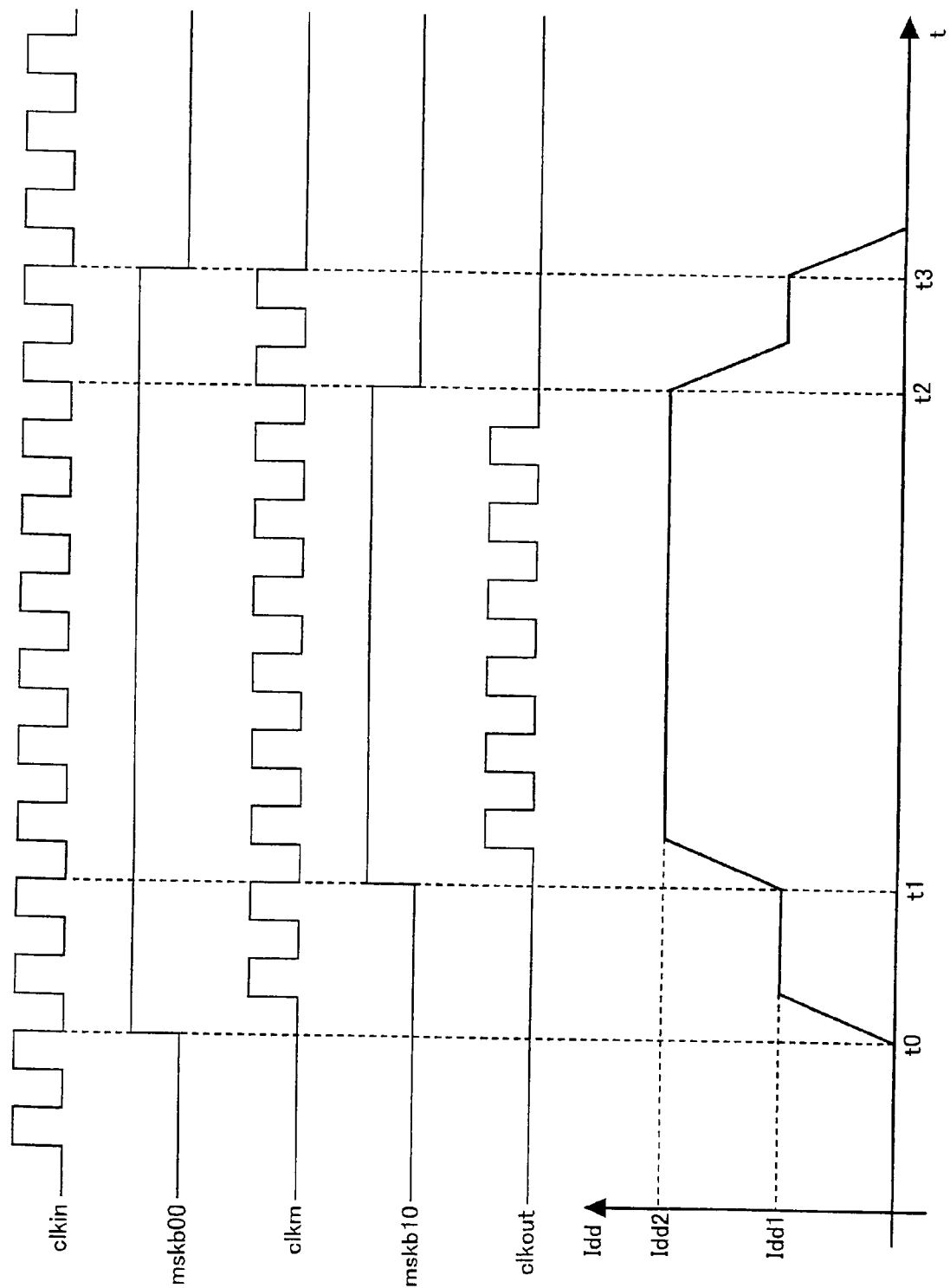
FIG. 3 is a timing chart of an operational example of the distribution circuit according to the embodiment of the present invention.
Figure 4:
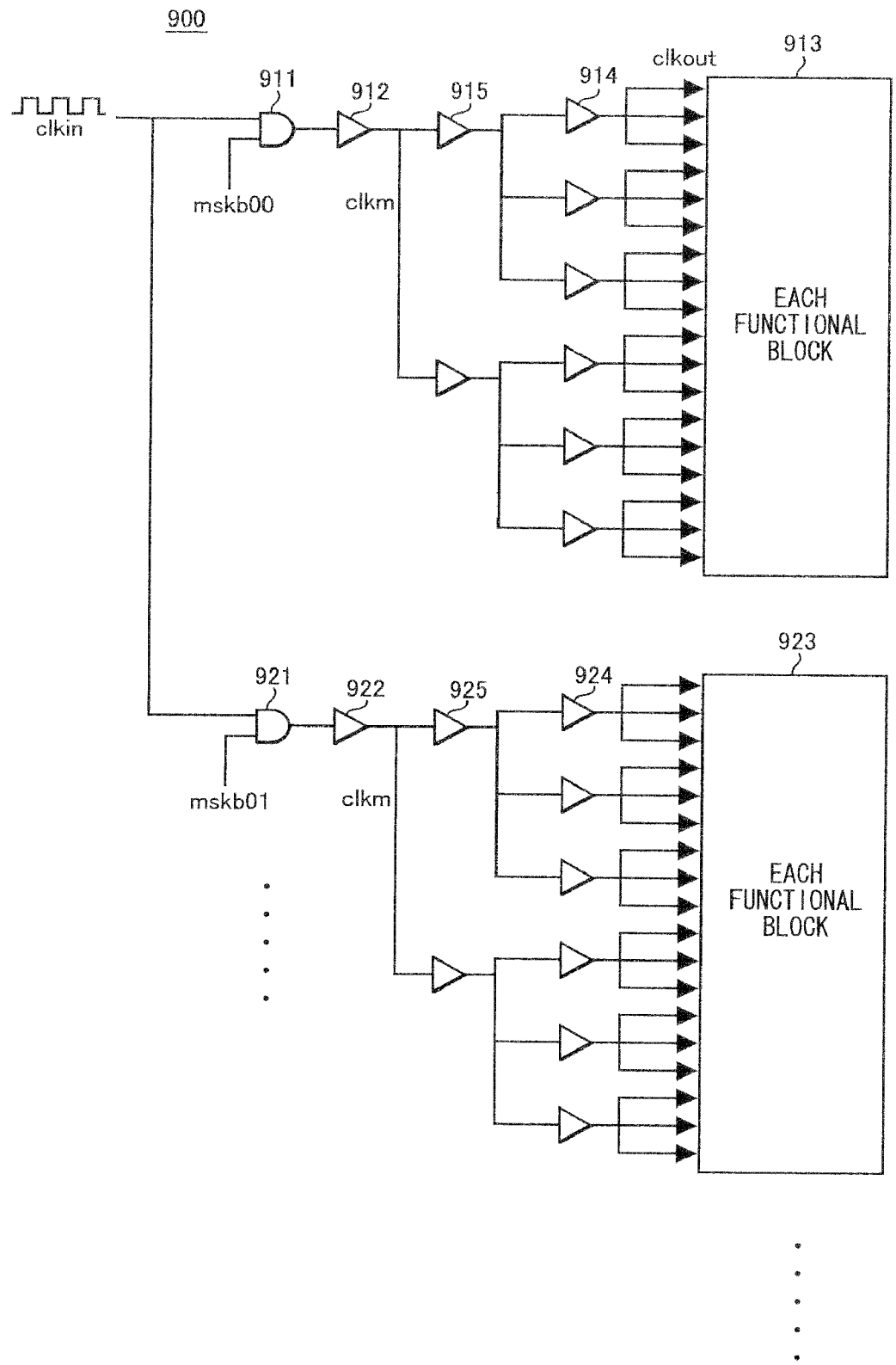
FIG. 4 is a circuit diagram of an example of a conventional clock distribution circuit.
Figure 5:
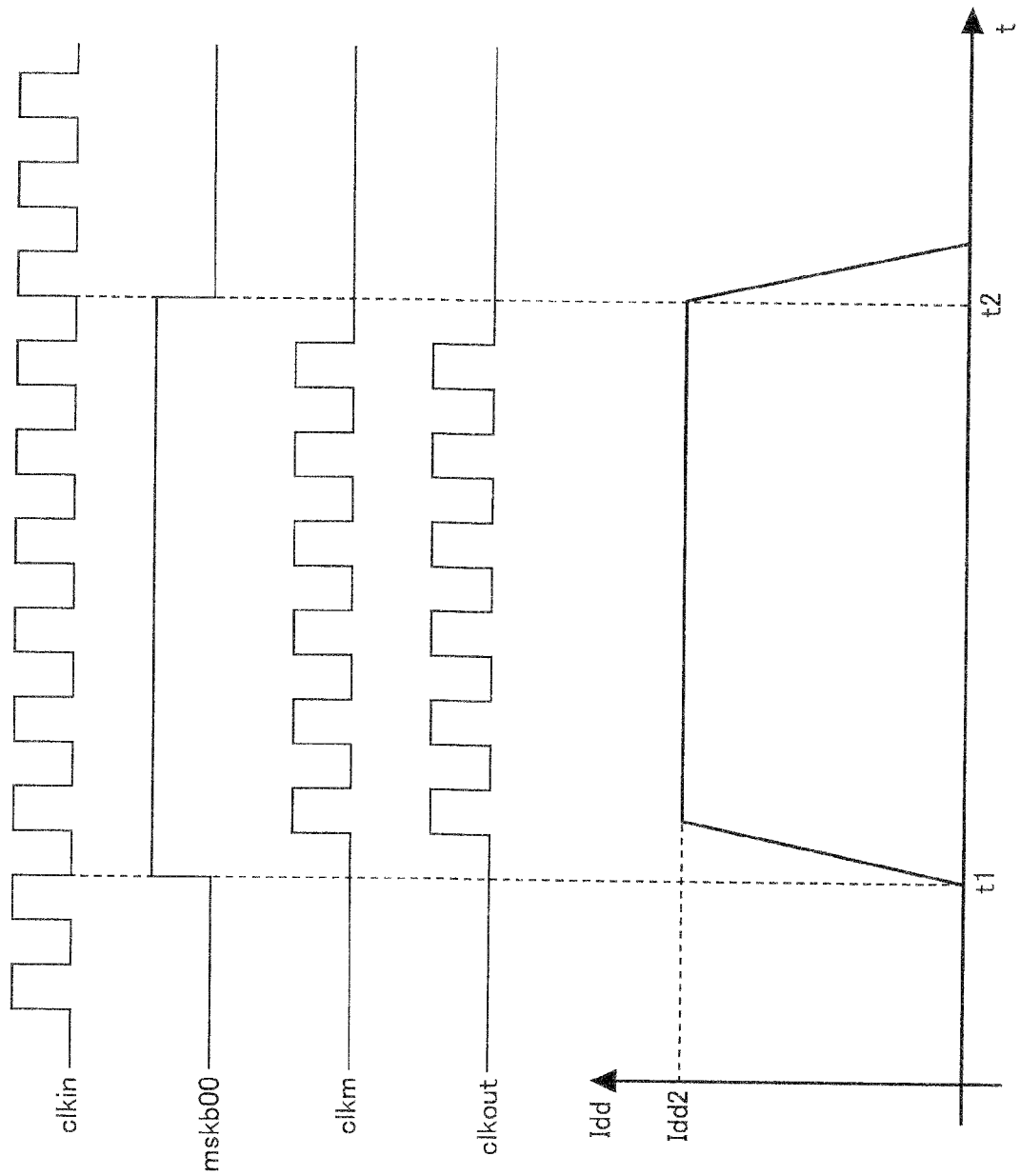
FIG. 5 is a timing chart of an operational example of the conventional clock distribution circuit.

Referring to FIG. 3, operations of the clock distribution circuit 12 of the present invention are subsequently described in detail. FIG. 3 is a timing chart showing clock output timings of the clock distribution circuit 12.

As shown in FIG. 3, the clock clkin is input to the first-stage mask 121. At timing t0, the control signal mskb00 input to the first-stage mask 121 is switched from disable to enable. The first-stage mask 121 is accordingly turned ON to cancel the masking of the output clock clkin. The first-stage mask 121 sends the clock clkin to the first-stage buffer 122 to drive the first-stage buffer 122. At this time, the control signal mskb10 input to the second-stage mask 123 is disabled. Hence, the first-stage buffer 122 sends the clock clkm to the second-stage buffer 125 and the second-stage mask 123, but the second-stage mask 123 is not driven. Thus, at timings t0 to t1, the first-stage buffer 122 and the second-stage buffer 125 starts consuming a current, and a current consumption amount Idd gradually increases. After a while, the amount stays at a fixed consumption amount Idd1.

At timing t1, the control signal mskb10 input to the second-stage mask 123 is switched from disable to enable. The second-stage mask 123 is accordingly turned ON to cancel masking of the output clock clkm. The second-stage mask 123 sends the clock clkm to the second-stage buffer 124 to drive the second-stage buffer 124. The second-stage buffer 124 sends the clock clkout to thereby execute functions of the functional block 131. Until timing t3, the control signals mskb00 and mskb10 are kept enabled, so the first-stage buffer 122 and the second-stage buffers 124 and 125 are continued to operate.

During a period from timings t1 to t2, the first-stage buffer 122 and the second-stage buffers 124 and 125 start current consumption, and a current consumption amount Idd gradually increases from the fixed consumption amount Idd1 and then stays at the fixed consumption amount Idd2. At this time, the consumption amount Idd2 is an amount of current consumed by the three buffers 122, 124, and 125, which is larger than the consumption amount Idd1 as an amount of current consumed by the two buffers 122 and 125. In this way, the current consumption amount increases in two steps until the first-stage buffer 122 and the second-stage buffers 124 and 125 are driven.

At timing t3, the control signal mskb10 input to the second-stage mask 123 is switched from enable to disable. The second-stage mask 123 is accordingly turned OFF to mask the output clock clkm. The second-stage mask 123 stops driving the second-stage buffer 124. At this time, the control signal mskb00 input to the first-stage mask 121 is kept disabled, and the first-stage buffer 122 is driven. Thus, at timings t3 to t4, the second-stage buffer 124 stops power consumption, and the current consumption amount Idd gradually decreases from the fixed consumption amount Idd2 and stays at the fixed consumption amount Idd1.

At timing t4, the control signal mskb00 input to the first-stage mask 121 is switched from enable to disable. The first-stage mask 121 is accordingly turned OFF to mask the output clock clkin. The first-stage mask 121 stops driving the first-stage buffer 122. As a result, all the buffers 122, 124, and 125 stops operating. Hence, all the buffers 122, 124, and 125 stop current consumption, and the current consumption amount Idd gradually decreases down to zero from the fixed consumption amount Idd1.

As described above, in the semiconductor integrated circuit 1 of the present invention, the clock distribution circuit of the clock tree structure is provided with multistage clock masks to independently drive the clock masks in stages. More specifically, whether or not to cancel masking of a clock from the root to the terminal of the clock tree structure is controlled to thereby drive buffers from the root to the terminal in stages. As a result, a change amount in rush current that flows in response to ON/OFF states of the clock mask can be reduced. To be specific, the power consumption amount Idd does not jump to the consumption amount Idd2 but increases first up to the consumption amount Idd1 and then increases to the consumption amount Idd2. As a result, the power consumption amount Idd is gradually changed stepwise, not abruptly. Accordingly, a current change amount per unit time is not large, and the current circuit can be simplified and downsized.

The clock distribution circuit employing the clock mask 121 has been hitherto used to save power consumption. In the clock distribution circuit, a system operational frequency increases from a frequency level in the clock OFF state. Hence, the power supply circuit as a device set is designed to have an ability to handle not only the maximum current amount but a change amount in current at the time of supplying a clock. In the clock distribution circuit of the present invention, a rush current that flows in accordance with ON/OFF states of the clock mask, can be reduced, so the power supply circuit as the device set can be simplified and downsized.

Furthermore, in this embodiment, one pair of clock masks 121 and 123 are series-connected in each stage, but the present invention is not limited thereto. Plural clock masks may be provided in each stage in accordance with any possible current change. Moreover, in this embodiment, the clock mask 123 is series-connected between the clock buffer 124 and the clock buffer 125, but the present invention is not limited thereto. The order of connecting the clock mask and the clock buffer can be changed. For example, the clock mask 123, the clock buffer 125, and the clock buffer 124 may be connected in series. Further, the functional blocks 131, 132, . . . can be composed of plural functional blocks. In this case as well, multistage clock masks can be arranged in the plural functional blocks similar to the clock distribution circuit of the present invention. Also in this case, the clock mask and the clock buffer can be provided in each stage.

It is apparent that the present invention is not limited to the above embodiment that may be modified and changed without departing from the scope and spirit of the invention.

What is claimed is:

1. A semiconductor integrated circuit, comprising:
a clock output circuit outputting a clock;
a clock distribution circuit distributing a clock output from the clock output circuit; and
a control circuit controlling operations of the clock output circuit and the clock distribution circuit,
the clock distribution circuit including:
a first clock buffer receiving a clock output from the clock output circuit;
a first clock mask series-connected to the first clock buffer and controlling clock input to the first clock buffer;

a second clock buffer series-connected to the first clock buffer and receiving a clock output from the first clock mask; and a second clock mask series-connected to the first clock buffer and the second clock buffer and controlling clock input to the second clock buffer, the control circuit controlling the second clock mask in accordance with an operation of the first clock mask.

2. The semiconductor integrated circuit according to claim 1, wherein the control circuit sequentially drives the first clock mask and the second clock mask to sequentially send the input clock to the first clock buffer and the second clock buffer.

3. The semiconductor integrated circuit according to claim 1, wherein the second clock buffer includes two or more seriesconnected clock buffers, and the second clock mask is connected between the first clock buffer and the second clock buffer.

4. The semiconductor integrated circuit according to claim 1, wherein the second clock buffer includes two or more seriesconnected clock buffers, and the second clock mask is connected to a clock input terminal of the series-connected second clock buffer.

5. The semiconductor integrated circuit according to claim 1, wherein the first clock mask and the second clock mask are sequentially driven, and the second clock mask and the first clock mask are sequentially turned OFF.

6. The semiconductor integrated circuit according to claim 1, wherein the clock distribution circuit has a clock tree structure.

7. A clock distribution method for inputting and distributing a clock, comprising:

outputting a clock;

distributing the clock;

controlling output of the clock and the distribution of the clock with a control circuit;

sending the clock from a first clock mask to a first clock buffer;

outputting the clock from the first clock buffer to a second clock buffer;

controlling clock input to the second clock buffer with a second clock mask; and the control circuit controlling the second clock mask in accordance with operation of the first clock mask.

* * * * *